United States Patent [19]
Gschweitl

[11] Patent Number: 5,781,441
[45] Date of Patent: Jul. 14, 1998

[54] METHOD TO DETERMINE THE PURITY OF TREATED USED GLASS

[75] Inventor: Karlheinz Gschweitl, Prebuch, Austria

[73] Assignee: Binder+ Co Aktiengesellschaft, Gleisdorf, Austria

[21] Appl. No.: 541,497

[22] Filed: Oct. 10, 1995

[30] Foreign Application Priority Data

Oct. 25, 1994 [AT] Austria ..................................... 2004/94

[51] Int. Cl.$^6$ .............................. G06F 19/00; G01N 33/00
[52] U.S. Cl. ..................... 364/473.01; 73/866; 209/587; 209/588
[58] Field of Search .................. 364/473.01, 473.02, 364/468.15–468.17, 552, 555, 567; 73/866; 209/587, 588, 930; 241/DIG. 38

[56] References Cited

U.S. PATENT DOCUMENTS 3,802,558  4/1974  Rhys ........................................ 209/588
5,321,496  6/1994  Shofner et al. ......................... 356/238
5,456,127  10/1995  Gschweitl ............................... 73/866

*Primary Examiner*—Reba I. Elmore
*Assistant Examiner*—Steven R. Garland
*Attorney, Agent, or Firm*—Collard & Roe, P.C.

[57] ABSTRACT

Method to determine the purity of treated used glass, whereby the sample quantity is taken from the treated used glass and arranged in one layer and is sent trickling down a free-falling path, the foreign bodies according to non-ferrous metals and opaque foreign materials being blown out and weighed after a separate identification, and the ratios of non-ferrous metal additions to the whole sample quantity and of the opaque foreign materials to the whole sample quantity respectively being determined. In order to be able to carry out such a method in a particularly simple manner, it is provided that the foreign materials are continuously weighed together, and depending on which kind of foreign materials—non-ferrous metals or opaque foreign materials—has been identified, the increase in weight is attributed to this identified group.

10 Claims, 3 Drawing Sheets

METHOD TO DETERMINE THE PURITY OF TREATED USED GLASS

FIELD OF THE INVENTION

The present invention relates generally to a method to determine the purity of treated used glass. More specifically, the present invention relates to such a method whereby foreign bodies contained in a sample of treated used glass are blown out and weighed after a separate identification according to non-ferrous metals and opaque foreign particles, and in order to determine the quality of the sample, the ratios of non-ferrous metal particles and opaque foreign particles respectively to the sample quantity are determined.

The requirements concerning the purity of treated used glass are very high because presently, up to 95% of used glass is added to the melt, and thereby a maximum of 20 g of opaque foreign particles and 5 g of non-ferrous metals may be contained in a ton of used glass.

These high degrees of purity must be guaranteed by the processors of used glass and have to be proved by samples of the treated used glass.

DESCRIPTION OF RELATED ART

A method to determine the purity of treated used glass is known from the U.S. Pat. No. 5,456,127. There, representative samples are taken from the stream of already treated glass by means of an automated sampler and are then fed to a collecting funnel. From this collecting funnel, the samples are conveyed to an analysing device by a vibrating conveyor. In this analysing device, opaque materials, such as ceramics, porcelain, or stones as well as non-ferrous metals from the sample, are seperated from the pure glass, and the separated materials are conveyed to respective associated collecting trays. These three collecting trays stand on weighing cells connected to a computer which determines the share of the sample quantity.

Since the samples are separated into three fractions of materials (opaque materials, non-ferrous metals, and glass), two identification sensors—one for opaque materials and one for non-ferrous metals—and two blowout devices for separating the respective identified solid particle are required since the solid materials have to be weighed separately for the analysis. Furthermore, three weighing cells are required altogether, that is one each for opaque materials, for non-ferrous metals and for glass, in order to be able to calculate, possibly using a correction factor determined by manually sorting the separated materials for glass particles, the shares of faulty materials from the values obtained by weighing. For determining the correction factor, the share of pure glass in the separated foreign materials is determined through manual sorting of these and is accordingly taken into account when the quality of the sample is calculated.

With this known method, a considerable effort is required for the separate treatment of the two fractions of foreign materials, non-ferrous metals on one hand and opaque foreign materials (subsequently referred to as KSP) on the other hand.

OBJECT OF THE INVENTION

The object of the present invention is to propose a method of the kind as mentioned above, which is easy to carry out.

In accordance with the invention, this is obtained by continuously weighing the two groups—opaque particles and non-ferrous metals—of foreign materials together and attributing the increase in weight to the according group depending on which group has been identified before a change in weight.

Through these proposed measures, a simplified execution of the method is provided. A separate weighing of the individual groups of foreign materials such as opaque foreign materials and non-ferrous metals is not necessary anymore. Additionally, compared with the known method, a more straightforward facility can be employed in the practical execution of the method according to the invention.

After the passing of a certain interval t of time, the quantities of non-ferrous metals and opaque foreign materials sorted out are put into relation with the sample subset processed during this time and these calculated proportional values are compared with predefined warning thresholds. With this provision, the advantage arises that it is possible to take a hand in the treatment of the used glass very quickly, for example to reduce the throughput of the used glass furnished with additions in order to reduce the share of foreign materials in the treated used glass, or to increase the throughput of used glass ready for treatment in order to enhance the economy of the treatment of used glass if the quality of the treated used glass allows it.

The prevailing tendency of the quality of the treated used glass can be detected if the ratios of the quantity of non-ferrous metals and the quantity of opaque foreign materials respectively to the whole sample quantity determined during a time interval t are compared with the ratios determined in a certain number of time intervals t directly succeeding this said time interval t, for example four to ten time intervals t. This makes it possible to take a hand in the treatment of the used glass contaminated with foreign materials even before the provided warning thresholds are reached or exceeded.

The ratios determined over a longer time period T, for example one hour, can be averaged, which provides a very simple possibility to establish an average quality of the treated used glass to be aimed at, starting from which, lower and upper warning thresholds can be set. In case of exceeding or, respectively, falling below these limits, the separated material of the sample is manually sorted and, after identification of the quantity of glass particles possibly separated alongside, the corrected ratios are determined, the proportionate allotment to non-ferrous metals and opaque foreign materials of the quantity of glass particles separated alongside preferably ensueing according to empirical values.

The detection of a prevailing tendency in the development of the quality of the treated used glass in an especially simple way is possible if the number of non-ferrous metal particles detected in one time interval is compared with the numbers of non-ferrous metal particles detected in a certain number of time intervals t directly succeeding this said time interval t, for example four to ten time intervals t. In the same manner, the number of opaque foreign particles detected in one time interval t is compared with the numbers of opaque foreign particles detected in a certain number of time intervals t directly succeeding this said time interval t, for example four to ten time intervals t.

A further object of the invention is to propose a facility for execution of the method in accordance with the invention.

Such a facility includes a sampler, which can be introduced into a stream of treated used glass and which may be conveyed to a delivery system which leads to a chute, possibly over a lined-up vibrating conveyor, whereby in the area of the chute or a free-falling path following the chute, sensors for the identification of non-ferrous parts and opaque parts are arranged in separate rows proceeding at a right angle to the free-falling path. These sensors control blast nozzles also arranged at a right angle to the free-falling path. A tray for collecting the separated materials is arranged on the side of the free-falling path turning away from the blast nozzles and a further tray for collecting the pure glass is provided, both of which are supported by weighing cells connected to a computer. According to the present invention, the blast nozzles are arranged in only one row proceeding at a right angle to the free falling path and the sensors or the blast nozzles are connected to a computer through signal lines.

Through these measures, a simple construction of the facility is made possible. A second row of blowout nozzles and the arrangement of two trays for holding the separated non-ferrous metal particles as well as the opaque foreign materials, as intended in a known facility, can be omitted. Through the elimination of one of the two rows of blowout nozzles, which are arranged on both sides of the free-falling path in the known facility, an unwanted mutual influencing of the blowout nozzles is also avoided, which makes possible a more exact separation of foreign particles from the treated used glass.

BRIEF DESCRIPTION OF THE DRAWINGS

The invention will now be explained in detail in accordance with the drawings, in which.

DETAILED DESCRIPTION OF THE ILLUSTRATED EMBODIMENT

Figure 1:
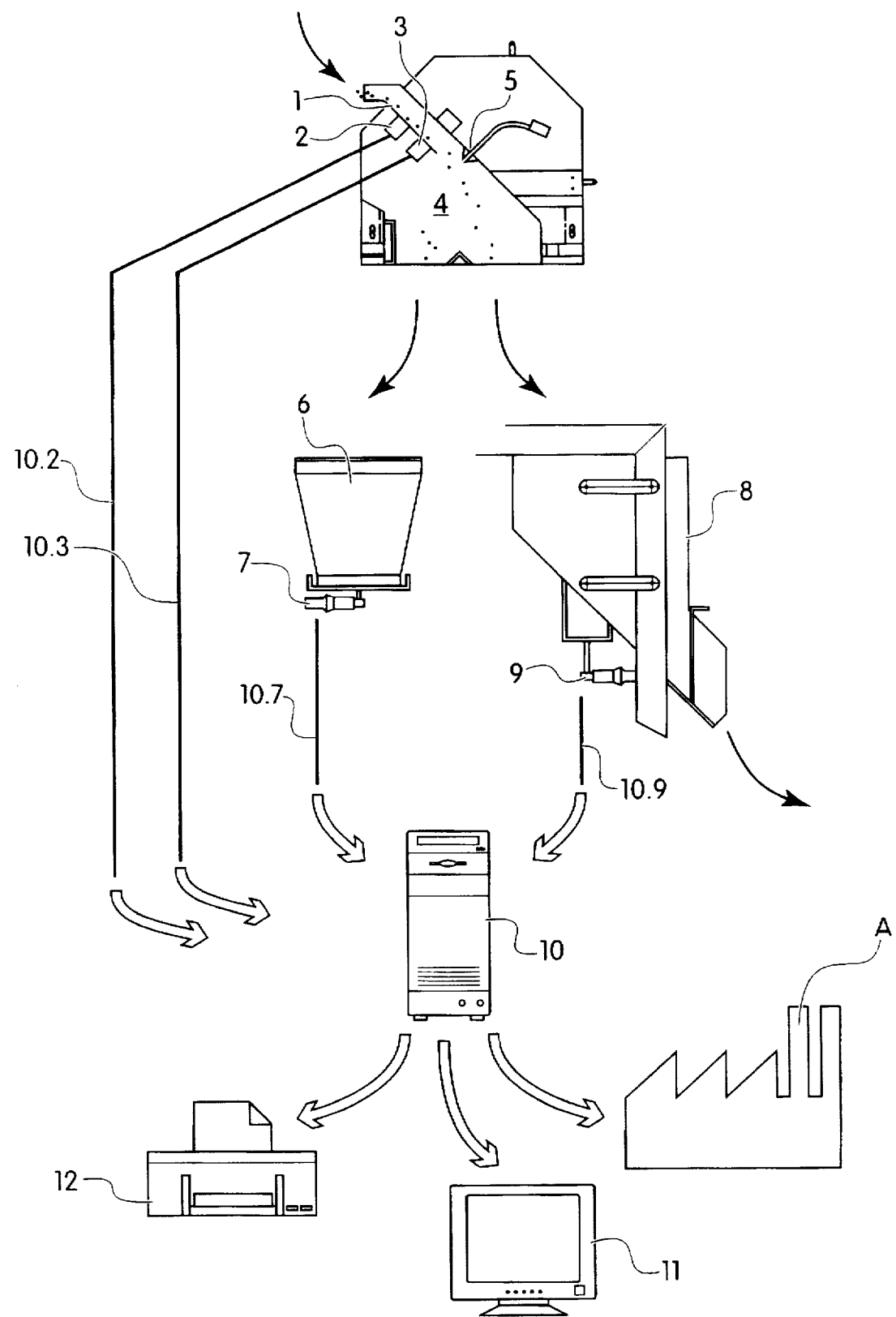
FIG. 1 schematically shows a facility for the execution of the method according to the invention.

The method in accordance with the invention is described with reference to FIG. 1.

The sampling from the stream of used glass cleaned in a used glass washing facility and the sampling preparation through drying, removal of fine particles by suction and screening out is done in the same way as is disclosed in the U.S. Pat. No. 5,456,127.

The prepared sample is arranged in one layer and applied to a chute 1 and passes to sensor rows 2 and 3 arranged over the whole width, with the sensors 2 serving for the identification of non-ferrous metals and the sensors 3 serving for the identification of opaque foreign materials. A free falling path 4 is adjacent to the chute 1. When one of the sensors 2, 3 detects a contamination—non-ferrous metals (subsequently referred to as NE) or KSP—it transmits a pulse signal corresponding to the kind of contamination on the respective data line 10.2 or 10.3 to the computer 10 which activates the blast nozzles 5 with a time delay, which blast nozzles then blow out the contamination from the glass stream. From the duration of the single pulse signals transmitted to the computer 10, the grain sizes of the contaminations can also be calculated.

The blown-out contaminations are conveyed by guiding devices not shown in the drawings to a collector tray 6 which stands on a weighing cell 7. The weighing cell 7 is connected by the data line 10.7 to the computer 10 which determines the change in weight as the result of blowing out the contamination and collates it to the kind of contamination (NE or KSP), adds it up and records the respective latest value of each of the groups of contaminations NE and KSP.

The pieces of pure glass, having passed the free-falling path uninfluenced, are collected in a pure glass tray 8, which also stands on a weighing cell 9, which is connected to the computer 10 by the data line 10.9. The computer records the respective latest value of the weight.

Figure 2:
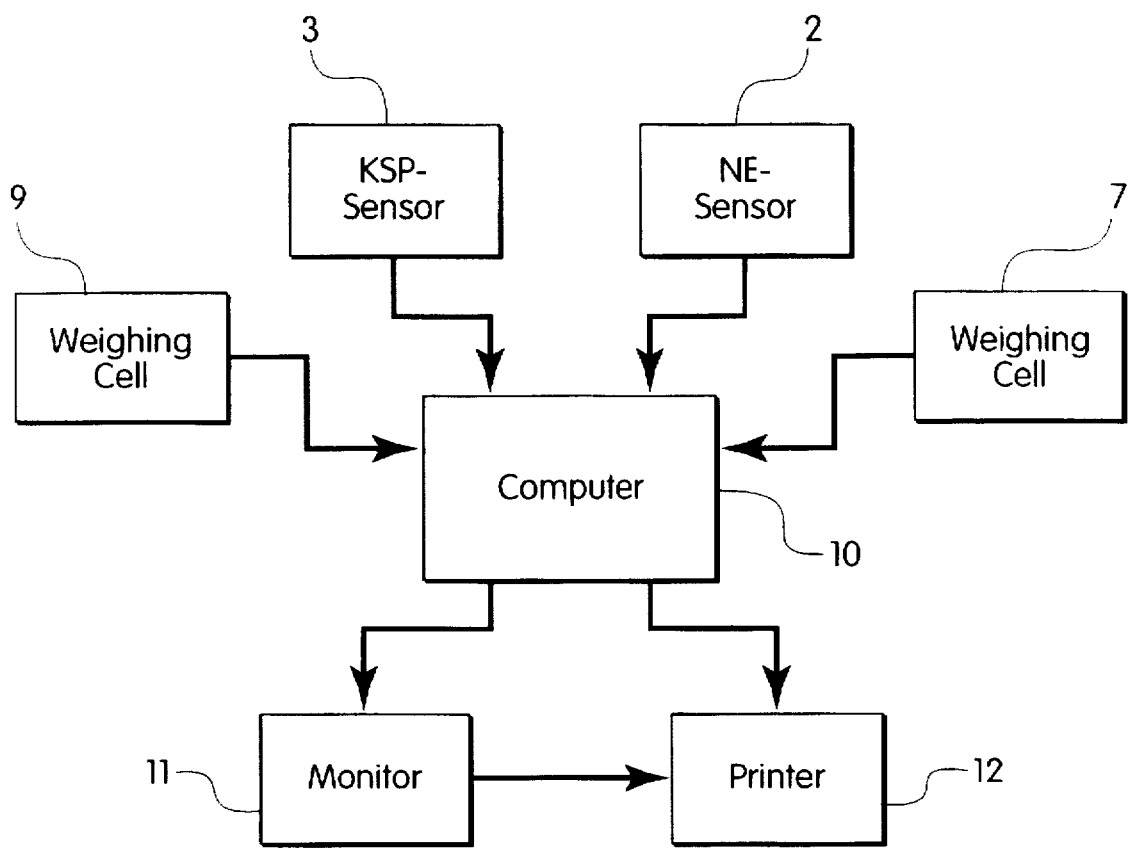
FIG. 2 shows a block diagram of the analysing device.

As can be seen in FIG. 2, the computer is connected on its input side to the sensors 2 and 3 and to the weighing cells 7 and 9 for determining the increases in weight of the pure glass tray 8 and the foreign materials tray 6, and on its output side to a monitor 11 and a printer 12.

For the analysis, the weight increases of the collector tray 6 stored in the computer 10, separated into NE and KSP contaminations, are put into relation, over an adjustable, defined period t, preferably between 1 and 30 minutes, to the totality of the sample quantity carried through in that period. This sample quantity is made up of the increases in weight in the collector tray 6 as a result of NE and KSP plus the increases in tray 8, accumulated during the defined period t. The results of these analyses are displayed on a monitor 11 and can be printed out on the printer 12 if necessary. In any event, they remain stored inside the computer.

Figure 3:
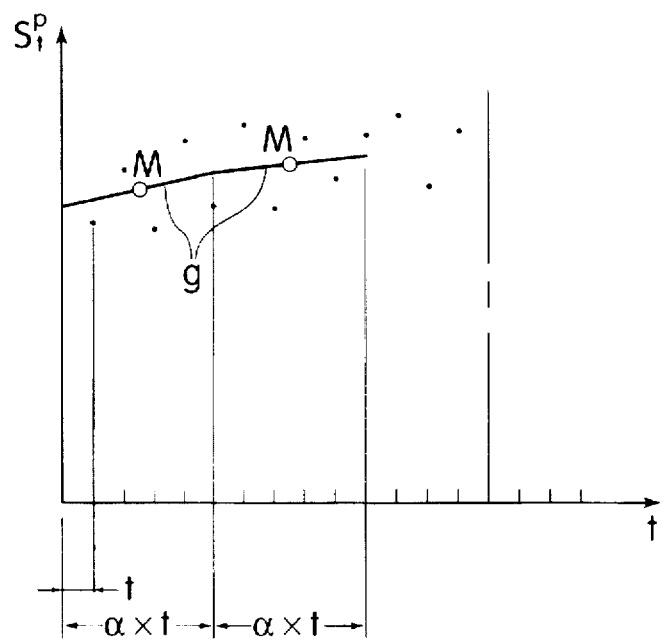
FIG. 3 shows a diagram explaining the tendency analysis.

For the tendency analysis, it is provided as can be seen in FIG. 3 that a certain number a between 4 and 10 of subsequent analysis results of such analysis cycles are plot over a time axis as an accumulation of dots of ratios NE/sample quantity and KSP/sample quantity, and trend lines g are laid through these two accumulations of dots using a regression procedure. The positive or negative slopes of these lines show the tendency prevailing during these analysis cycles towards improprevement or deterioration of the sample's purity. This tendency is also displayed on the monitor and can be printed out.

In a simplified tendency analysis, only the number of pulse signals for NE and/or KSP during the period t in relation to the sample quantity instead of the proportions between NE weight increase or KSP weight increase and the sample quantity can be used as proportional number(s) and be introduced into a tendency analysis as described above.

Further it is proposed that with each actual tendency analysis, the tendencies of at least the preceding analysis are also displayed.

It is furthermore proposed to write the average values of the results from the single analysis cycles into a storage. In this storage there should be room for 100 to 500 analysis cycles. The storage is constantly updated by taking in the latest and disposing of the oldest value. This way, an average facility value AW should be calculated.

For determining the facility value AW, at least the average values calculated in the single periods t within the most recent hour should be used and the respective average be calculated. In longer operation, the facility value AW can be calculated from all the averages stored in the storage of the computer 10.

Starting with the facility value AW, warning thresholds can be set as in FIG. 4 which lie below and above the facility value AW respectively by the value ±f.

During the sampling cycle, the aberration of the central point M of the most recently calculated trend line g from the empirical value AW is identified in percent.

Figure 4:
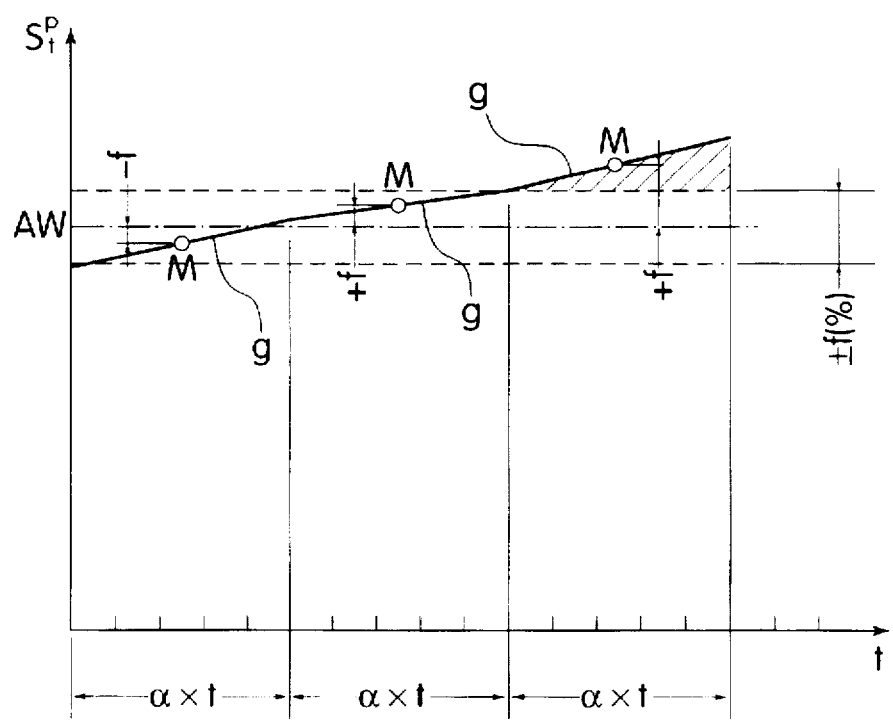
FIG. 4 shows a diagram explaining the application of the tendency analysis.

This percentage reflects the quality of the material sampled during the most recent a time periods (FIG. 4).

When the preset warning thresholds are exceeded, the computer takes hand in the process of treating used glass (A) by means of control devices, for example reducing the input quantity in a facility for treating used glass not shown in the drawings.

When a warning threshold is exceeded or fallen short of, appropriately a manual sighting of a sample of the material collected in the tray 7 will be performed. If, thereby, inferior quality of the sample is confirmed, this can be corrected by interference into the operation of a lined-up facility for treating used glass (not shown in the drawings) in the sense of a reduction of the throughput of used glass ready for treatment. On the other hand, when the lower warning threshold is fallen short of, the throughput of the facility for treating used glass can be increased in order to make its operation more economic after the according high quality has been confirmed by a manual sighting.

In the performance of a hand sighting, glass particles blown out with the fault materials are separated and distributed to the groups of fault materials NE and KSP according to empirical values, more glass particles being blown out with the very lightweight NE parts such as bottle caps than with the heavier KSP parts.

At the end of each sample, a program calculates the average of all aberrations and therefore leads to a statement about the purity of the whole sample. This statement is printed and serves documentation purposes.

In order to be able to make a statement about the quantity of contaminations contained in the sample with this kind of sample analysis—in particular, whether the quality of the material adheres to the predefined standards or expected values—it is necessary to include comparison values.

To that end, the weight ratio values or numbers of fault particle detections (relative to the whole sample quantity and the whole sample period) respectively of a great number of preceding, orderly concluded samplings are written into a storage. The storage can be updated after every sampling by including the most recent and disposing of the oldest value. This function, however, may be switched off after a stable condition has been reached.

What is claimed is:

1. A method for determining the purity of treated used glass, which comprises the steps of
    (a) removing a sample quantity from a stream of the treated used glass containing foreign bodies selected from the group of non-ferrous metals and the group of opaque foreign materials,
    (b) permitting the sample quantity of the treated used glass to trickle down a free-falling path,
    (c) separating the groups from each other,
    (d) blowing the separated groups out of the free-flowing path,
    (e) weighing the blown-out groups of non-ferrous metals and opaque foreign materials,
    (f) determining the ratios of the weighed group of non-ferrous metals and the weighed group of opaque foreign materials to the sample quantity to ascertain the purity of the treated used glass, and further comprising the improvement of
    (g) weighing the groups continuously and together, and
    (h) attributing any increase in weight to that group which has been identified immediately before the increase in weight.

2. The method of claim 1, wherein the removed sample quantity is permitted to trickle down in a layer.

3. The method of claim 2, wherein the ratios calculated over an extended period of time are averaged to obtain an average ratio, a maximum upward and downward aberration from this average aberration is defined, the groups separated from the sample quantity are manually sorted when the maximum aberration is exceeded, ascertaining the quantity of any treated used glass particles contained in the blown-out groups of non-ferrous metals and opaque foreign materials, correcting the ratio in response to the ascertained quantity of any treated used glass particles contained in the blown-out groups of non-ferrous metals and opaque foreign materials, and determining the proportion of the quantity of the treated used glass particles in the blown-out groups of non-ferrous metals and opaque foreign materials.

4. The method of claim 3, wherein the proportion is determined in accordance with empirically obtained values.

5. The method of claim 1, comprising the further steps of calculating, after a predetermined period of time, the ratio of the quantity of weighed groups of non-ferrous metals and opaque foreign materials to the quantity of the sample processed during said period of time, and comparing the calculated ratio with a predetermined warning threshold.

6. The method of claim 5, comprising the further step of comparing the ratios calculated in a succession of said predetermined periods of time whereby a trend of said ratios is determined.

7. The method of claim 6, wherein the ratios are calculated in four to ten successive periods of time.

8. The method of claim 1, comprising the further steps of calculating, after a predetermined period of time, the ratio of the quantity of the weighed group of non-ferrous metals to the quantity of the sample processed during said period of time, comparing the ratios calculated in an immediate succession of said predetermined periods of time whereby a trend of said ratios is determined, and calculating, after a predetermined period of time, the ratio of the quantity of the weighed group of opaque foreign materials to the quantity of the sample processed during said period of time, comparing the ratios calculated in an immediate succession of said predetermined periods of time whereby a trend of said ratios is determined.

9. The method of claim 8, wherein the ratios are calculated in four to ten successive periods of time.

10. An apparatus for determining the purity of treated used glass originally containing foreign bodies selected from the group of non-ferrous metals and the group of opaque foreign materials, which comprises
    (a) means for delivering a stream of the treated used glass to a delivery path comprised of a chute followed by a free-falling path wherealong a sample quantity of the stream is permitted to trickle down,
    (b) means for sensing and separating the groups of non-ferrous metals and opaque foreign materials, the sensing and separating means being comprised of
        (1) two separate rows of sensors arranged transversely to the delivery path for respectively sensing the group of non-ferrous metals and the group of opaque foreign materials, and
        (2) a single row of blast nozzles arranged transversely to the free-falling path at one side thereof and controlled by the sensors for separating the foreign bodies from the sample quantity whereby a stream of purified glass is obtained,
    (c) collectors arranged at a side of the free-falling path opposite the one side for respectively receiving the foreign bodies and the purified glass,
    (d) a respective weighing cell supporting each collector,
    (e) a computer connected to the weighing cells, the computer determining the ratio of non-ferrous metals and the weighed group of opaque foreign materials to the sample quantity to ascertain the purity of the treated used glass, and
    (f) control signal transmitting lines connecting the sensing and separating means to the computer.

* * * * *